United States Patent [19]

Marks et al.

[11] Patent Number: 5,119,215
[45] Date of Patent: Jun. 2, 1992

[54] LCD WITH SELF REGULATING PTC THERMISTOR HEATING ELEMENT

[75] Inventors: Gay L. Marks, Muskegom; Indra J. Loomba, Grand Haven; John Saling, II, Whitehall, all of Mich.

[73] Assignee: Thermo-O-Disc, Incorporated, Mansfield, Ohio

[21] Appl. No.: 735,845

[22] Filed: Jul. 25, 1991

Related U.S. Application Data

[62] Division of Ser. No. 481,324, Feb. 20, 1990, Pat. No. 5,059,767.

[51] Int. Cl.⁵ .................. G02F 1/133; H05B 3/06; H05B 3/00
[52] U.S. Cl. .................. 359/44; 219/209; 219/522; 359/86
[58] Field of Search .............. 359/44, 45, 86, 95; 219/209, 522

[56] References Cited

U.S. PATENT DOCUMENTS

| | | | |
|---|---|---|---|
| 2,557,705 | 6/1951 | Burton et al. | 219/543 |
| 4,147,927 | 4/1979 | Pirotte | 219/541 |
| 4,625,163 | 11/1986 | Germer | 359/86 X |
| 4,634,225 | 1/1987 | Haim et al. | 359/86 X |
| 4,724,304 | 2/1988 | Teshima et al. | 219/219 |
| 4,845,344 | 7/1989 | Price et al. | 219/547 |
| 4,954,692 | 9/1990 | Shikama et al. | 219/365 |
| 4,987,289 | 1/1991 | Bishop et al. | 219/209 |

FOREIGN PATENT DOCUMENTS 63-274564 11/1988 Japan .

*Primary Examiner*—Stanley D. Miller
*Assistant Examiner*—Ron Trice
*Attorney, Agent, or Firm*—Jones, Day, Reavis & Pogue

[57] ABSTRACT

Positive temperature coefficient thermistors are mounted in heat transfer relationship to a support member of a material that is pervious to light. The thermistors are positioned on the support member to provide a large unobstructed area through which light may pass. The self-limiting nature of the thermistors eliminates the need for a separate temperature responsive heater control switch. The heater is useable for heating liquid crystal displays, and allows back lighting of such displays by a light source positioned on the opposite side of the heater from the display.

3 Claims, 2 Drawing Sheets

LCD WITH SELF REGULATING PTC THERMISTOR HEATING ELEMENT

This is a division, of application Ser. No. 07/481,324, filed Feb. 20, 1990 now U.S. Pat. No. 5,059,767.

BACKGROUND OF THE INVENTION

This application relates to the art of heaters and, more particularly, to heaters of the type used for heating devices that are illuminated by a light source. The invention is particularly applicable to heaters used with liquid crystal displays and will be described with specific reference thereto. However, it will be appreciated that the invention has broader aspects and can be used for providing heat to other devices.

A known type of heater includes one or more electrical resistance heating elements mounted to a support member that is pervious to light. Heaters of this type require separate temperature responsive controls for turning the heater on and off.

Another type of heater includes positive temperature coefficient thermistors mounted to an opaque support. This type of heater requires no separate temperature responsive control because the thermistors are self-limiting. However, a special source of illumination is required because the support for the thermistors is opaque.

It would be desirable to have a heater that required no separate temperature responsive control or any special type of illumination for devices associated with the heater.

SUMMARY OF THE INVENTION

A heater of the type described includes positive temperature coefficient thermistors mounted to a support member that is pervious to light. The heater requires no separate temperature responsive control because of the self-limiting nature of the thermistors. A conventional light source can be positioned on the opposite side of the heater from an associated device, and the device will be illuminated by light passing through the light pervious heater support member.

In a preferred arrangement, the heater includes a plurality of spaced-apart positive temperature coefficient thermistors electrically connected in parallel. The thermistors are preferably arranged in a loop having a large open central area through which light rays may pass.

The thermistors are preferably completely encapsulated in the support member. The support member has an outer periphery, and the thermistors are located closely adjacent such outer periphery.

The support member may have a groove therein for receiving the thermistors. The groove is then filled with a potting compound that also covers the thermistors.

It is a principal object of the present invention to provide an improved heater that is both self-limiting and pervious to light.

It is also an object of the invention to provide an improved heater for use with liquid crystal displays.

It is a further object of the invention to provide a heater that is simple and economical to manufacture and assemble.

DESCRIPTION OF A PREFERRED EMBODIMENT

Figure 1:
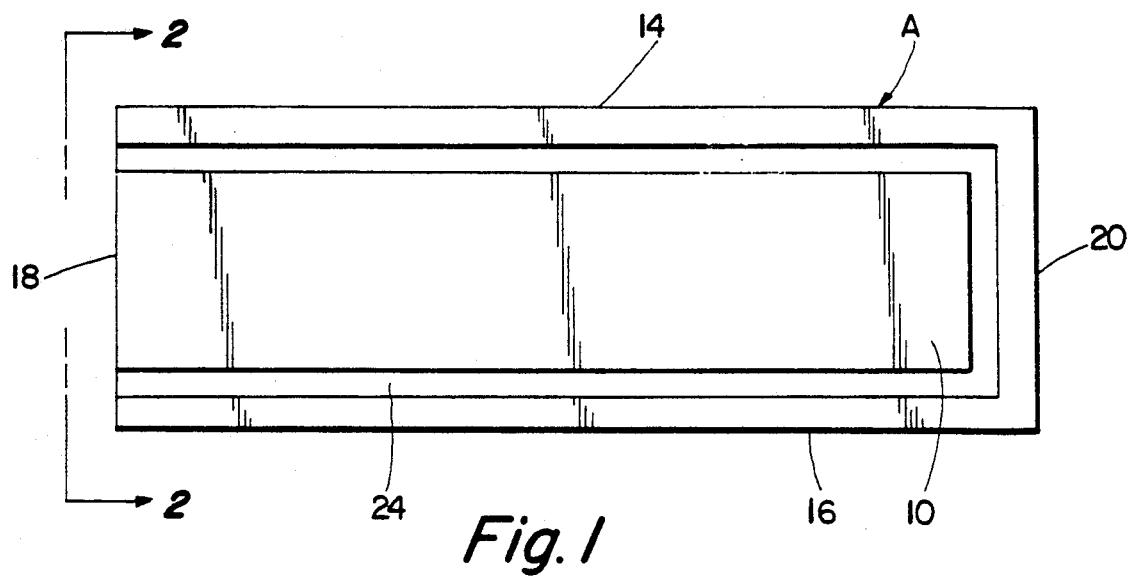
FIG. 1 is a top plan view of a support member used with the heater of the present application.
Figure 2:
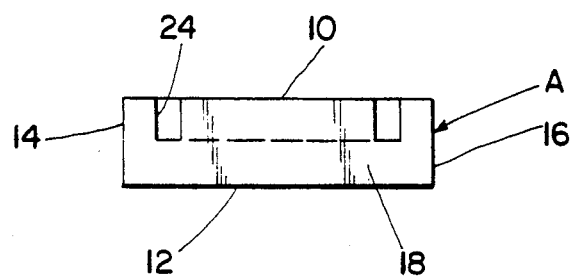
FIG. 2 is a side elevational view taken generally on line 2—2 of FIG. 1.

Referring now to the drawing, wherein the showings are for purposes of illustrating a preferred embodiment of the invention only and not for purposes of limiting same, FIGS. 1 and 2 show a support member A having a substantially flat rectangular shape. It will be recognized that the support member can take other shapes depending upon the environment in which it will be used. Support member A is of a material that is pervious to light, and may be transparent or translucent. Although support member A could be made of glass, it is preferably made of a synthetic plastic material, such as an acrylic.

Support member A has substantially flat and parallel opposite surfaces 10, 12, and a continuous outer periphery defined by parallel opposite sides 14, 16 and parallel opposite ends 18, 20.

A continuous generally U-shaped groove 24 is provided in support member A extending inwardly from outer surface 10 thereof. Groove 24 is located closely adjacent the outer periphery of support member A. By way of example only, and not by way of limitation, where support member A has a width between opposite sides 14, 16 of about 0.93 inch, the distance from each side 14, 16 to the edge of groove 24 is a maximum of about 0.1 inch. Where support member A has a length between opposite ends 18, 20 of about 2.86 inch, the distance from end 20 to the edge of groove 24 is a maximum of about 0.2 inch. Groove 24 opens outwardly at end 18 as shown in FIG. 2.

Figure 3:
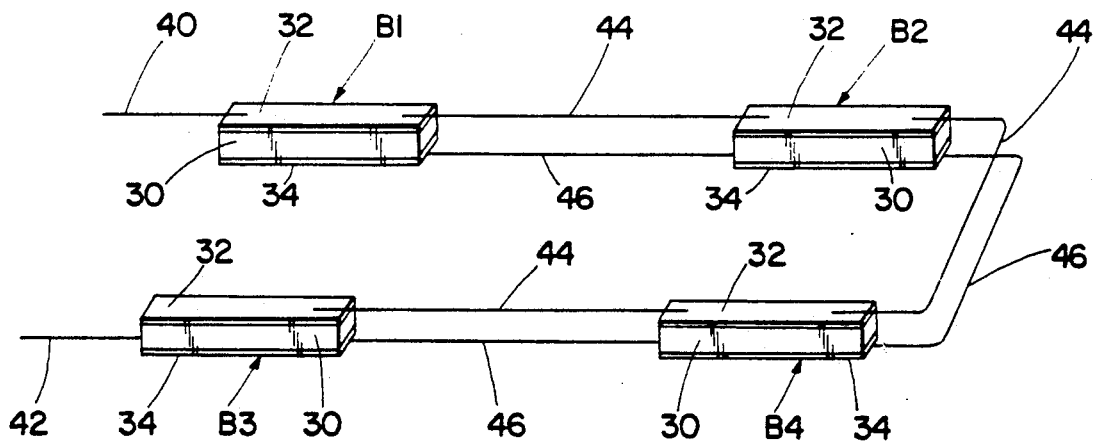
FIG. 3 is a perspective illustration of a plurality of positive temperature coefficient thermistors electrically connected in parallel.

FIG. 3 shows a plurality of positive temperature coefficient thermistors B1, B2, B3 and B4. Each thermistor includes a conductive body of a material having a positive temperature coefficient of resistance, such as a doped ceramic of barium titanate or the like. Electrodes 32, 34 are bonded to the opposite surfaces of thermistor bodies 30. In the arrangement shown, the thermistors are in the general shape of rectangular solids. However, it will be recognized that other shapes can be used. The resistance and switching temperature of the thermistors can be varied by changing the composition of the doped ceramic material and by changing the geometry of the thermistors.

When the heater is intended for use with a liquid crystal display, each thermistor B has a switching temperature at which it changes from its high resistance state to its low resistance state that is less than about −10° C. At temperatures above about −10° C., the thermistors are in their high resistance state and only a very small trickle current can pass therethrough so that very little heat is generated. At temperatures below about −10° C., the thermistors are in their low resistance state so that a substantial current flows therethrough and a significant amount of heat is generated.

When the temperature of the thermistors again rises above about −10° C. due to their own induced heat, they automatically switch to their high resistance state. Thus, the heater is self-limiting and requires no separte temperature responsive control for turning same on and off.

In the arrangement shown, thermistors B1, B2 have a predetermined length, and are spaced-apart from one another a distance that is less than such predetermined length. The same relationship exists for thermistors B3, B4. Although the heater circuit shown does not include a thermistor that would be received in the portion of groove 24 extending parallel to end 20 of support member A, it will be recognized that one or more thermistors can be provided in the circuit for reception in such portion of the groove.

One electrical lead 40 is connected with an electrode 32 of thermistor B1, and another electrical lead 42 is connected with electrode 34 of thermistor B3. Electrical leads 40, 42 are adapted to be connected to a suitable voltage source in a known manner. Electrical leads 44 connect electrodes 32 of all the thermistors with one another, while leads 46 connect electrodes 34. Thus, thermistors B1-B4 are electrically connected in parallel with one another.

Figure 4:
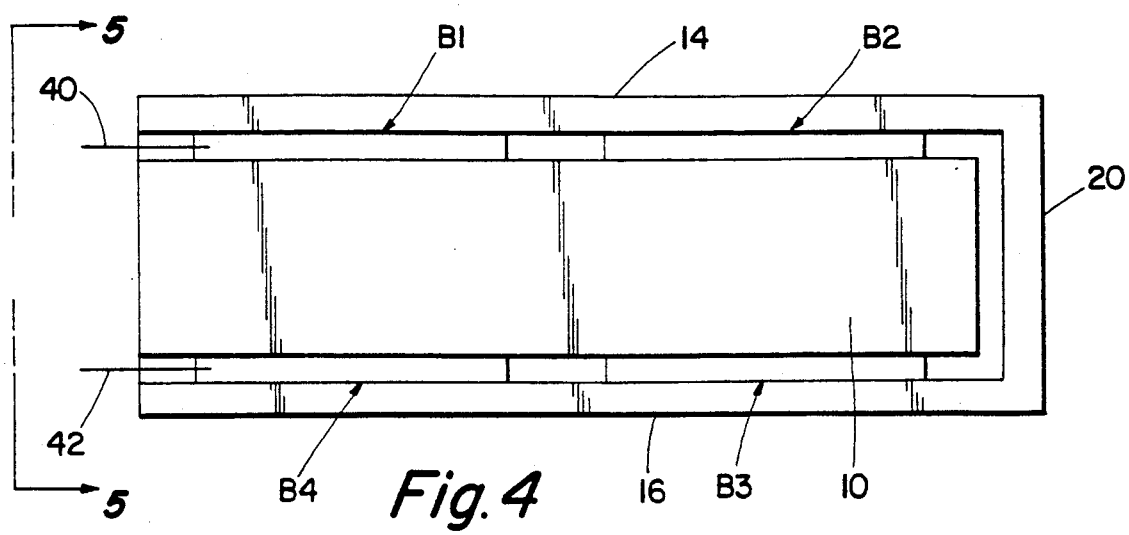
FIG. 4 is a top plan view of the support member of FIG. 1 showing the thermistors of FIG. 3 assembled thereto.
Figure 5:
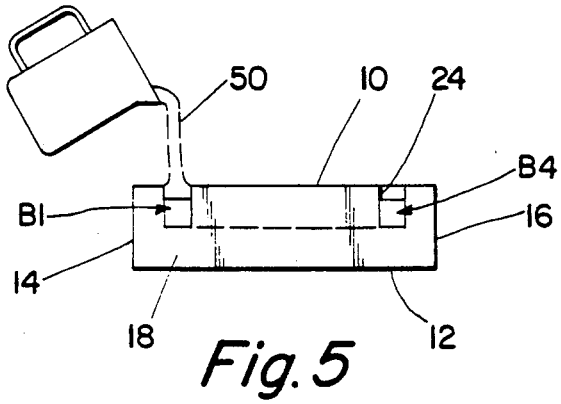
FIG. 5 is an end elevational view taken generally on line 5—5 of FIG. 4, and showing a potting compound being placed in covering relationship to the thermistors.

FIGS. 4 and 5 show the thermistor heater circuit of FIG. 3 received in groove 24 in support member A. Thermistors B1-B4 are preferably positioned with their electrodes 32, 34 extending substantially parallel to support member opposite surfaces 10, 12. The thermistors are then electrically conductive in a direction extending substantially perpendicular to opposite surfaces 10, 12.

The depth of groove 24 is greater than the thickness of the thermistors between electrodes 32, 34 thereof, and is preferably of such a depth that the thermistors are located approximately midway between opposite surfaces 10, 12 of support member A. It is possible to form the groove of such a depth that the thermistors will be located substantially closer to one surface than the other. However, special mounting instructions would then be necessary so that the installer would know which surface of the support member to position against a liquid crystal display. When the thermistors are located approximately midway between the opposite surfaces of the support member, the heater has multidirectional mounting capabilities.

Thermistors B1-B4 are opaque, and are positioned in a loop having a very large open central area as shown in FIG. 4. Therefore, light may freely pass through support member A in the entire open central area of the loop. Thermistors B1-B4 preferably occupy substantially less than 20% of the surface area of support member A. Also, the open loop area through which light may pass is preferably at least about 80% of the surface area of support member A.

FIG. 5 shows a dielectric potting compound 50, such as an epoxy, being placed in groove 24 to completely fill same and to completely cover thermistors B1-B4 so that they are completely encapsulated. Potting compound 50 is preferably placed in groove 24 to be substantially flush with outer surface 10 of support member A.

Instead of positioning the thermistors in a groove in a support member and then filling same with potting compound, it will be recognized that the thermistors can be molded into a support member of plastic material so that they are completely encapsulated within the support member. Obviously, other mounting arrangements for the thermistors on the support member are also possible.

Figure 6:
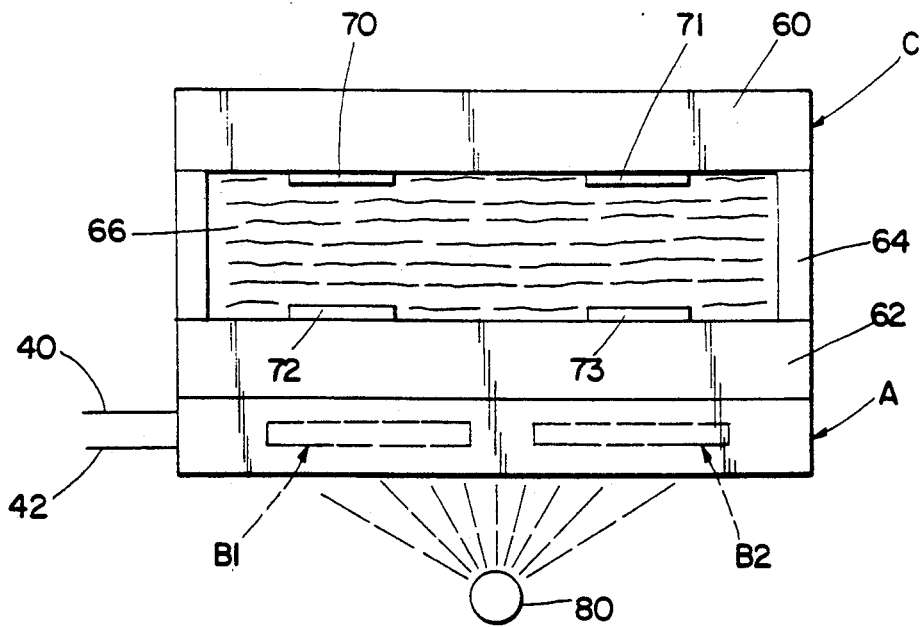
FIG. 6 is a top plan view of the heater assembled to the back of a typical liquid crystal display.

FIG. 6 shows a typical liquid crystal display or cell C including transparent cover and back plates 60, 62 sealingly secured together in spaced-apart relationship by a peripheral gasket 64 to define a chamber that is filled with a liquid crystal fluid 66 having nematic molecules. Transparent electrodes of indium tin oxide as at 70-73 are provided on the inner surfaces of plates 60, 62 for selective energization to align the nematic molecules so that light may pass through the liquid crystal fluid. The electrodes are provided in shapes for displaying letters, numbers or other indicia.

The improved heater of the present application is positioned in physical contact with back plate 62 so that heat is transferred to the liquid crystal display C by both conduction and radiation. Support member A may be placed in physical contact with back plate 62 by bonding, mechanical fasteners or a biasing means. A light source 80 positioned on the opposite side of support member A from liquid crystal display C is capable of illuminating display C through support member A.

Although the invention has been shown and described with reference to a preferred embodiment, it is obvious that equivalent alterations and modifications will occur to others skilled in the art upon the reading and understanding of this specification. The present invention includes all such equivalent alterations and modifications, and is limited only by the scope of the claims.

What is claimed is:

1. In a heated liquid crystal display the combination comprising:
    a liquid crystal cell containing a liquid crystal material and said liquid crystal cell having a back;
    a support member placed in physical contact with said back of said liquid crystal cell;
    said support member having substantially planar and substantially parallel opposite surfaces and an outer periphery;
    said support member being of a material that is pervious to light such that a source of illumination positioned adjacent one of said surfaces will illuminate objects positioned adjacent the other of said surfaces;
    heater means mounted on said support member in a heat transfer relationship therewith for heating said support member;
    said heater means including positive temperature coefficient thermistor means switchable between high and low resistance states in a predetermined ambient temperature range;
    said thermistor means performing the dual functions of heating and determining when heating occurs;
    said heater means occupying not more than 20% of the areas of one of said opposite surfaces; and
    a light source for illuminating said display;
    said light source positioned on the opposite side of said support member from said liquid crystal cell.

2. The heated liquid crystal display of claim 1 wherein said heater means is encapsulated in said support member.

3. The heated liquid crystal display of claim 1 wherein said heater means is in the shape of a loop located closely adjacent said outer periphery of said support member, said loop having an open central portion, and said light source being positioned for transmitting light through said open central portion of said loop.

* * * * *